(12) United States Patent
Wang

(10) Patent No.: US 12,366,198 B2
(45) Date of Patent: Jul. 22, 2025

(54) HYDROGEN-OXYGEN CYCLE ENGINE AND USING METHOD THEREFOR

(71) Applicant: Lichen Wang, Beijing (CN)

(72) Inventor: Lichen Wang, Beijing (CN)

( * ) Notice: Subject to any disclaimer, the term of this patent is extended or adjusted under 35 U.S.C. 154(b) by 0 days.

(21) Appl. No.: 18/406,491

(22) Filed: Jan. 8, 2024

(65) Prior Publication Data

US 2024/0141825 A1 May 2, 2024

Related U.S. Application Data

(63) Continuation of application No. PCT/CN2023/092699, filed on May 8, 2023.

(30) Foreign Application Priority Data

May 16, 2022 (CN) .......................... 202210526986.0

(51) Int. Cl.
| | | |
|---|---|---|
| *F02B 43/12* | (2006.01) | |
| *F02B 47/02* | (2006.01) | |
| *F02B 57/02* | (2006.01) | |
| *F02B 57/04* | (2006.01) | |
| *F02B 77/08* | (2006.01) | |

(52) U.S. Cl.
CPC .............. *F02B 43/12* (2013.01); *F02B 57/02* (2013.01); *F02B 57/04* (2013.01); *F02B 77/082* (2013.01); *F02B 77/086* (2013.01); *F02B 47/02* (2013.01); *F02B 2201/04* (2013.01)

(58) Field of Classification Search
CPC .......... F02B 57/02; F02B 43/12; F02B 57/04; F02B 77/082; F02B 77/086
See application file for complete search history.

(56) References Cited

U.S. PATENT DOCUMENTS

| | | | | |
|---|---|---|---|---|
| 3,696,795 A | * | 10/1972 | Smith .................... | F02M 25/00 123/25 C |
| 3,862,624 A | * | 1/1975 | Underwood ............ | F02B 47/08 123/3 |
| 4,099,489 A | * | 7/1978 | Bradley ................ | F01K 25/005 123/3 |
| 2010/0206646 A1 | | 8/2010 | Lin | |

FOREIGN PATENT DOCUMENTS

| | | |
|---|---|---|
| CN | 105257372 A | 1/2016 |
| CN | 105673199 A | 6/2016 |
| CN | 114991946 A | 9/2022 |
| WO | 2014145955 A2 | 9/2014 |

OTHER PUBLICATIONS

The World Intellectual Property Organization (WIPO) International Search Report for PCT/CN2023/092699 Jul. 24, 2023 6 pages (Including English translation).

* cited by examiner

*Primary Examiner* — Kevin A Lathers
(74) *Attorney, Agent, or Firm* — ANOVA LAW GROUP, PLLC

(57) ABSTRACT

A hydrogen-oxygen cycle engine. The hydrogen-oxygen cycle engine comprises a cylinder assembly, a hydrogen supply assembly, an oxygen supply assembly, a cycling medium assembly, an atomized water assembly, a condensate water recovery assembly and a control system. Said engine has the advantages of reasonable structural design, high automation degree, no carbon emission, etc., and can thoroughly solve the problem of environmental pollution. Also provided is a using method for the engine.

11 Claims, 1 Drawing Sheet

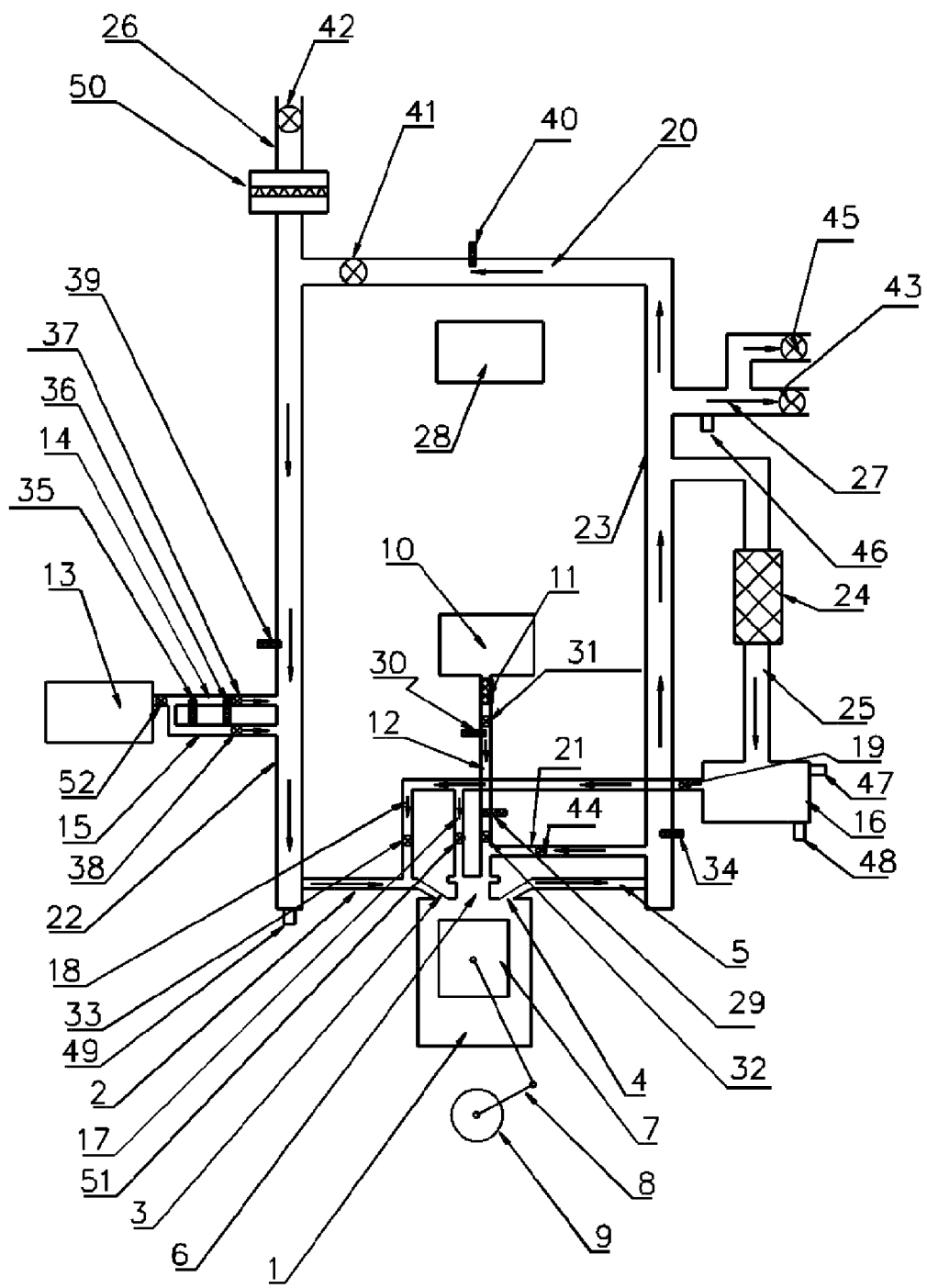

HYDROGEN-OXYGEN CYCLE ENGINE AND USING METHOD THEREFOR

CROSS REFERENCE TO RELATED APPLICATION

This application is a continuation application of PCT Application Serial No. PCT/CN2023/092699, filed on May 8, 2023, which claims the priority to Chinese Patent Application No. 202210526986.0, filed on May 16, 2022, the contents of all of which are incorporated herein by reference in their entirety.

TECHNICAL FIELD

The present invention relates to the technical field of automotive internal combustion engines, marine internal combustion engines, and power generation internal combustion engines, and in particular to a hydrogen-oxygen cycle engine and a method of using same.

BACKGROUND

At present, as relevant national policies on new energy vehicles continue to be implemented, car companies and vehicle research and design institutes continue to increase their research and development efforts on new energy vehicles, resulting in an increasing number of patent applications related to new energy vehicles. Common new energy vehicles include lithium battery vehicles, oil and gas hybrid vehicles, hydrogen energy vehicles, etc. Taking hydrogen energy vehicles as an example, the engine is one of the main components of the vehicle. How to improve the energy conversion efficiency of the engine to avoid environmental pollution is a technical problem to be solved. In view of this, the applicant proposed a hydrogen-oxygen cycle engine and a method of using same, so as to meet actual design and use needs.

SUMMARY

The purpose of the present invention is to provide a hydrogen-oxygen cycle engine and a method of using same. The hydrogen-oxygen cycle engine is reasonable in structural design and high in the degree of automation, and has the advantages such as lower energy consumption, longer mileage, high output power, high thermal efficiency, discharge of only clean water without any pollutants, no production of carbon emission compared with traditional engines, etc., so that the problem of environmental pollution can be completely solved. The hydrogen-oxygen cycle engine and the method of using same can be applied to marine, automotive and power generation internal combustion engines.

In order to achieve the above object, the present invention adopts the technical solution as follows:
  a hydrogen-oxygen cycle engine, including a cylinder assembly, a hydrogen supply assembly, an oxygen supply assembly, a circulating medium assembly, an atomized water assembly, a condensed water recovery assembly, and a control system; where the cylinder assembly includes a cylinder body, a first intake branch pipe, an intake valve, an exhaust valve, an exhaust branch pipe, a nozzle, a piston, a connecting rod, and a crankshaft; the piston is drivingly connected to the crankshaft by means of the connecting rod and is arranged in the cylinder body, and the top of the cylinder body is respectively connected to the intake valve, the exhaust valve, and the nozzle; one end of the first intake branch pipe is connected to the intake valve, and one end of the exhaust branch pipe is connected to the exhaust valve; the hydrogen supply assembly includes a hydrogen storage tank, a hydrogen flame arrester, and a hydrogen pipeline; both ends of the hydrogen pipeline are respectively connected to the hydrogen storage tank and the nozzle, and the hydrogen flame arrester is arranged at a joint between the hydrogen storage tank and the hydrogen pipeline; the oxygen supply assembly includes an oxygen storage tank, an oxygen intake main pipe, and an oxygen intake branch pipe; one end of the oxygen intake main pipe is connected to the hydrogen storage tank, and one end of the oxygen intake branch pipe is connected to the oxygen intake main pipe; the atomized water assembly includes an atomized water storage tank, a cylinder atomized water pipeline, an intake branch pipe atomized water pipeline, and a delivery pump; both ends of the intake branch pipe atomized water pipeline are respectively connected to the atomized water storage tank and the first intake branch pipe; one end of the cylinder atomized water pipeline is connected to the intake branch pipe atomized water pipeline, and the other end thereof is connected to the nozzle; the delivery pump is arranged at a joint between the atomized water storage tank and the intake branch pipe atomized water pipeline; the circulating medium assembly includes a circulating medium pipeline, a circulating medium branch pipeline, an intake main pipe, and an exhaust main pipe; both ends of the circulating medium pipeline are respectively connected to one end of the intake main pipe and one end of the exhaust main pipe, and both ends of the circulating medium branch pipeline are respectively connected to the other end of the exhaust main pipe and the hydrogen pipeline; the other end of the oxygen intake main pipe is connected to the intake main pipe, and the other end of the oxygen intake branch pipe is connected to the intake main pipe; the other end of the intake main pipe is connected to the first intake branch pipe; the condensed water recovery assembly includes a condenser, a condensed water pipeline, and a condensed water storage tank which is arranged in the atomized water storage tank; both ends of the condensed water pipeline are respectively connected to one end of the condenser and the condensed water storage tank; the other end of the condenser is connected to the exhaust main pipe; the condensed water storage tank is connected to the atomized water storage tank; the intake main pipe is further provided with an air intake pipe; the exhaust main pipe is further provided with an off-gas emission pipe which is connected to the exhaust main pipe; the control system includes a PLC controller, a human-computer interaction interface, and sensor assemblies; the PLC controller is respectively connected to the human-computer interaction interface and the sensor assemblies; the sensor assemblies include: a hydrogen flow sensor, a hydrogen pressure sensor, a hydrogen cut-off valve and a hydrogen throttle control valve which are arranged on the hydrogen pipeline, a cylinder atomized water control valve arranged on the cylinder atomized water pipeline, a temperature sensor arranged on the exhaust main pipe, an oxygen pressure sensor, an oxygen flow sensor and an oxygen flow control valve which are arranged on an oxygen main pipeline, an oxygen branch flow control valve arranged on an oxygen branch, a circulating medium pressure sensor arranged on the intake main pipe, an oxygen/hydrogen content sensor and a circulating medium control valve which are arranged on the circulating medium pipeline, an air intake control valve arranged on the air intake pipe, an off-gas emission control valve arranged on the off-gas emission pipe, and a branch pipe flow control valve arranged on the circulating medium branch pipeline; and the above-mentioned sensors are all connected to the PLC controller by means of data signals, and the PLC controller is connected to all the above-mentioned valves in a control manner.

As a further optimization of the above-mentioned technical solution, the off-gas emission pipe is further provided with an off-gas emission safety valve and an off-gas emission pipe trap; the condensed water storage tank is provided with an overflow port, and an automatic drain valve connected to the PLC controller; and the other end of the intake main pipe is further provided with an intake main pipe trap connected to the PLC controller.

As a further optimization of the above-mentioned technical solution, the air intake pipe is provided with a filter; the cylinder atomized water pipeline is further provided with a cylinder atomized water control valve which is connected to the PLC controller; and the oxygen main pipeline is further provided with an oxygen cut-off valve.

As a further optimization of the above-mentioned technical solution, the medium in the circulating medium assembly is water steam; and the hydrogen-oxygen cycle engine uses hydrogen as a fuel and oxygen as a combustion aid, and the off-gas after engine combustion contains only $H_2O$.

As a further optimization of the above-mentioned technical solution, the hydrogen-oxygen cycle engine adopts oxygen and hydrogen flow ratio control, and the PLC controller adjusts oxygen supply according to a data signal of the hydrogen flow sensor, so as to realize the adjustment of a hydrogen and oxygen combustion ratio.

As a further optimization of the above-mentioned technical solution, the PLC controller realizes, according to a data signal fed back by an oxygen/hydrogen content sensor in the circulating medium pipeline, oxygen fine tuning by controlling an oxygen branch pipe control valve, so as to achieve optimal operating conditions of the engine.

As a further optimization of the above-mentioned technical solution, the hydrogen-oxygen cycle engine has two operating modes of an oxygen-assisted combustion and an air-assisted combustion, which can be automatically switched.

As a further optimization of the above-mentioned technical solution, the hydrogen-oxygen cycle engine is applied in the field of automotive internal combustion engines, marine internal combustion engines, and power generation internal combustion engines.

A method of using the hydrogen-oxygen cycle engine provided in the present invention includes the following steps:

1) starting the engine by means of an ignition switch, and supplying power to various components of the hydrogen-oxygen cycle engine; when the engine is cold started for the first time, first switching on, by the PLC controller, an air control valve to introduce starting air; controlling, by the PLC controller according to a feedback value of a data signal of a hydrogen flow sensor, a throttle of the engine to inject hydrogen into a cylinder by means of a nozzle, such that hydrogen combusts with oxygen to push a piston, which in turn drives a connecting rod and a crankshaft to reciprocate and do work, and water steam formed after combustion passes through an exhaust valve and an exhaust branch pipe and then an exhaust main pipe, with part of the water steam entering a circulating pipeline to be mixed with oxygen by means of a flow control valve and then entering the cylinder to be mixed with hydrogen for combustion, and part of the water steam being condensed into water in a condenser through a condensed water pipeline and then entering a water storage tank for recycling as atomized water; gradually switching on, by the PLC controller according to feedback values of data signals of the hydrogen flow sensor and an oxygen flow sensor, an oxygen flow control valve to introduce oxygen, and synchronously switching off same until the air control valve is switched off to stop air from entering, in this case a hydrogen and oxygen combustion stage is entered, and a produced water steam circulating medium is emitted into atmosphere from an off-gas emission pipe on an exhaust main pipe bypass; and adjusting, by the PLC controller according to a feedback value of a circulating medium pressure sensor, emissions of the water steam by controlling an off-gas emission control valve, where when the pressure on a circulating medium pipeline rises to a set safety value, an off-gas emission safety valve is automatically switched on to ensure stable pressure of the system;

2) after the above-mentioned step 1), introducing, by the PLC controller according to the feedback values of data signals of the oxygen flow sensor and the circulating medium pressure sensor under operating conditions of a cylinder assembly, oxygen and the circulating medium into the cylinder through an intake main pipe, an intake branch pipe and an intake valve by controlling an oxygen main pipe control valve; introducing hydrogen and the circulating medium into the cylinder through a hydrogen pipeline, a circulating medium branch pipeline and the nozzle by controlling a hydrogen throttle control valve and a circulating medium branch pipeline control valve, and automatically switching on a cylinder atomized water control valve at the same time to spray atomized water into the cylinder; and monitoring, by the PLC controller, the feedback value of data signals of an oxygen/hydrogen content sensor in the circulating medium pipeline in real time, and adjusting trace hydrogen and oxygen content in the circulating medium in a timely manner by controlling an oxygen branch pipe control valve, so as to ensure the hydrogen and oxygen combustion is always in an optimal state;

3) acquiring, by the PLC controller according to the operating conditions of the cylinder assembly, the feedback values of data signals of the hydrogen flow sensor, the circulating medium pressure sensor, the oxygen flow sensor and the oxygen/hydrogen content sensor, and automatically controlling, by the PLC controller according to the feedback value of the hydrogen flow sensor, various control valves and adjusting the flow of the oxygen, circulating medium and atomized water, such that the engine operates in stable conditions;

4) monitoring, by the PLC controller, the operating conditions of the engine in real time, and automatically adjusting an opening of an atomized water control valve of the intake branch pipe to spray atomized water into the intake branch pipe;

5) continuously circulating the circulating medium in the cylinder of the engine according to steps 1), 2), 3), and 4); continuously adjusting, by the hydrogen-oxygen cycle engine, the amount of hydrogen injected through the nozzle to achieve large torque at low speed and large load and small torque at high speed and small load during operation; and monitoring, by the PLC controller, a temperature value of the circulating medium in real time according to a feedback value of a data signal of a temperature sensor in an exhaust pipe under the operating conditions of the cylinder assembly, so as to ensure a stable operating temperature of the engine;

6) when oxygen in an oxygen storage tank of the hydrogen-oxygen cycle engine is almost running out, issuing, by an oxygen pressure sensor, a signal, and at this time, automatically switching on, by the PLC controller, the air control valve, switching off an oxygen cut-off valve, automatically switching to an air combustion mode, and switching off a circulating medium pipeline control valve at the same time, such that part of the water steam generated by the engine is condensed into water in the condenser through the condensed water pipeline and then enters the water storage tank for recycling as atomized water, and part is emitted into atmosphere by means of the off-gas emission control valve and is no longer circulated;

7) issuing, by a hydrogen pressure sensor provided on the hydrogen pipeline of the hydrogen-oxygen cycle engine, an alarm signal to remind the supplement of hydrogen when the pressure of hydrogen is lower than a set value;

8) automatically discharging the condensed water in the pipelines by means of automatic traps provided on both the off-gas emission pipe and a medium circulation pipeline of the hydrogen-oxygen cycle engine during the operation of the engine;

9) the hydrogen-oxygen cycle engine being provided with an automatic drain valve, an overflow valve and a temperature sensor on the water storage tank, after the engine stops operating, monitoring, by the PLC controller, a feedback value of the temperature sensor, and when the temperature value reaches a freezing point, automatically draining the water in the water storage tank; and 10) cutting off the supply of hydrogen and oxygen promptly to ensure safe operation of the engine under emergency conditions that, for example, the oxygen and hydrogen pressures are lower than set values, the temperature of the circulating medium is higher than a set value, a collision occurs, and the hydrogen-oxygen cycle engine catches fire by means of emergency shut-off valves, inertia switches, and low-pressure interlock alarm devices provided on the hydrogen and oxygen pipelines, and a high-temperature interlock alarm device provided on the circulating medium pipeline of the hydrogen-oxygen cycle engine.

As a further optimization of the above-mentioned technical solution, the operating conditions of the cylinder assembly include a start and stop condition, an acceleration condition, a deceleration condition, an idle condition, and an air condition.

As a further optimization of the above-mentioned technical solution, when the engine stops, a hydrogen control valve is first switched off to stop the supply of hydrogen, an oxygen control valve is switched off at the same time, then switching off of a circulating water steam control valve is delayed, and the residual hydrogen and oxygen in mixing pipelines of the engine are brought into the cylinder using the circulating medium to continue to combust cleanly.

The hydrogen-oxygen cycle engine and the method of using same provided in the present invention has the following beneficial effects:

1. The hydrogen-oxygen cycle engine uses hydrogen as the fuel and oxygen as the combustion aid. The off-gas after engine combustion contains only water ($H_2O$), producing no carbon emission and pollutants, so that the problem of environment pollution is completely solved.

2. The hydrogen-oxygen cycle engine adopts a mixing cycle combustion technology of oxygen and water steam in the emitted off-gas of the engine. Hydrogen and oxygen combusting in the cylinder produces only water steam, the water steam in the exhaust pipe is introduced into the intake pipe as a circulating medium to be mixed with oxygen and dilute the oxygen, and then the mixed gas enters the cylinder through the intake pipe, such that the concentration of oxygen is reduced and the oxygen can be diluted according to a certain proportion.

3. In the hydrogen-oxygen cycle engine, the circulating medium pipeline is led to the front of the nozzle and connected to the hydrogen pipeline, the mixed hydrogen enters the cylinder through the nozzle on the cylinder, and at the same time, and the water condensed from the steam produced by combustion of hydrogen and oxygen enters the nozzle and is sprayed into the cylinder after being atomized in the nozzle to absorb heat and turn into steam, which further dilutes the hydrogen.

4. The hydrogen-oxygen cycle engine is provided with an atomized water nozzle on the intake branch pipe. The atomized water sprayed into the intake branch pipe is mixed with oxygen and the circulating medium and then enters the cylinder to produce water steam while absorbing heat, and the water steam expands to increase the volume. The hydrogen-oxygen cycle engine is provided with a hydrogen and atomized water nozzle on the cylinder. The hydrogen and the circulating medium are combusted with the combustion agent, that is, the oxygen while being sprayed into the cylinder with the atomized water to further dilute the hydrogen, and the heat produced by combustion vaporizes the condensed water into steam to expand to increase the pressure in the cylinder to assist in doing work. The amount of hydrogen, oxygen, water steam and condensed water sprayed into the cylinder is automatically adjusted according to a certain ratio.

5. Hydrogen and oxygen combusting in the cylinder produces only water steam, which is actually doing work in the cylinder. Meanwhile, hydrogen and oxygen combust to generate heat, such that water is vaporized into water steam to have its volume expanded, and the pressure in the cylinder is increased to push the piston to do work. With regard to the pressure in the cylinder of the engine, the amount of atomized water entering the cylinder can be adjusted according to needs to increase or decrease the pressure in the cylinder, and the maximum power of the internal combustion engine can be increased or decreased, thus the internal combustion engine becomes a variable power engine.

6. The water steam produced after the combustion of the hydrogen-oxygen cycle engine is cooled into water through the condensed water pipeline and then stored in the water storage tank, the excess water in the water storage tank is automatically discharged through an overflow port on the water storage tank, and the excess water steam in the off-gas is emitted through an off-gas emission valve by means of a pressure valve.
7. The hydrogen-oxygen cycle engine can work in two operating modes of an oxygen-assisted combustion and an air-assisted combustion, which can be automatically switched.
8. The hydrogen-oxygen cycle engine adopts oxygen and hydrogen flow ratio control, and the PLC controller adjusts oxygen supply according to a data signal of the hydrogen flow sensor, to realize the adjustment of a hydrogen and oxygen combustion ratio.
9. The PLC controller of the hydrogen-oxygen cycle engine realizes, according to the data signal fed back by the oxygen/hydrogen content sensor on the circulating medium pipeline, oxygen fine tuning by controlling the oxygen branch pipe control valve, so as to achieve optimal operating conditions of the engine.

BRIEF DESCRIPTION OF THE DRAWINGS

FIG. 1 is a schematic diagram of an overall structure of a hydrogen-oxygen cycle engine of the present invention.

DETAILED DESCRIPTION

A hydrogen-oxygen cycle engine and the method of using same of the present invention will be described in detail below with reference to FIG. 1.

A hydrogen-oxygen cycle engine, including a cylinder assembly, a hydrogen supply assembly, an oxygen supply assembly, a circulating medium assembly, an atomized water assembly, a condensed water recovery assembly, and a control system. The cylinder assembly includes a cylinder body 1, a first intake branch pipe 2, an intake valve 3, an exhaust valve 4, an exhaust branch pipe 5, a nozzle 6, a piston 7, a connecting rod 8, and a crankshaft 9. The piston is drivingly connected to the crankshaft by means of the connecting rod and is arranged in the cylinder body, and the top of the cylinder body is respectively connected to the intake valve, the exhaust valve, and the nozzle 6. One end of the first intake branch pipe is connected to the intake valve, and one end of the exhaust branch pipe is connected to the exhaust valve. The hydrogen supply assembly includes a hydrogen storage tank 10, a hydrogen flame arrester 11, and a hydrogen pipeline 12. Both ends of the hydrogen pipeline are respectively connected to the hydrogen storage tank and the nozzle, and the hydrogen flame arrester is arranged at a joint between the hydrogen storage tank and the hydrogen pipeline. The oxygen supply assembly includes an oxygen storage tank 13, an oxygen intake main pipe 14, and an oxygen intake branch pipe 15. One end of the oxygen intake main pipe is connected to the hydrogen storage tank, and one end of the oxygen intake branch pipe is connected to the oxygen intake main pipe. The atomized water assembly includes an atomized water storage tank 16, a cylinder atomized water pipeline 17, an intake branch pipe atomized water pipeline 18, and a delivery pump 19. Both ends of the intake branch pipe atomized water pipeline are respectively connected to the atomized water storage tank and the first intake branch pipe. One end of the cylinder atomized water pipeline is connected to the intake branch pipe atomized water pipeline, and the other end thereof is connected to the nozzle. The delivery pump is arranged at a joint between the atomized water storage tank and the intake branch pipe atomized water pipeline. The circulating medium assembly includes a circulating medium pipeline 20, a circulating medium branch pipeline 21, an intake main pipe 22, and an exhaust main pipe 23. Both ends of the circulating medium pipeline are respectively connected to one end of the intake main pipe and one end of the exhaust main pipe, and both ends of the circulating medium branch pipeline are respectively connected to the other end of the exhaust main pipe and the hydrogen pipeline. The other end of the oxygen intake main pipe is connected to the intake main pipe, and the other end of the oxygen intake branch pipe is connected to the intake main pipe. The other end of the intake main pipe is connected to the first intake branch pipe. The condensed water recovery assembly includes a condenser 24, a condensed water pipeline 25, and a condensed water storage tank which is arranged in the atomized water storage tank. Both ends of the condensed water pipeline are respectively connected to one end of the condenser and the condensed water storage tank. The other end of the condenser is connected to the exhaust main pipe. The condensed water storage tank is connected to the atomized water storage tank. The intake main pipe is further provided with an air intake pipe 26. The exhaust main pipe is further provided with an off-gas emission pipe 27 which is connected to the exhaust main pipe. The control system includes a PLC controller 28, a human-computer interaction interface, and sensor assemblies. The PLC controller is respectively connected to the human-computer interaction interface and the sensor assemblies. The sensor assemblies include: a hydrogen flow sensor 29, a hydrogen pressure sensor 30, a hydrogen cut-off valve 31 and a hydrogen throttle control valve 32 which are arranged on the hydrogen pipeline, a cylinder atomized water control valve 33 arranged on the cylinder atomized water pipeline, a temperature sensor 34 arranged on the exhaust main pipe, an oxygen pressure sensor 35, an oxygen flow sensor 36 and an oxygen flow control valve 37 which are arranged on an oxygen main pipeline, an oxygen branch flow control valve 38 arranged on an oxygen branch, a circulating medium pressure sensor 39 arranged on the intake main pipe, an oxygen/hydrogen content sensor 40 and a circulating medium control valve 41 which are arranged on the circulating medium pipeline, an air intake control valve 42 arranged on the air intake pipe, an off-gas emission control valve 43 arranged on the off-gas emission pipe, and a branch pipe flow control valve 44 arranged on the circulating medium branch pipeline. The above-mentioned sensors are all connected to the PLC controller by means of data signals, and the PLC controller is connected to all the above-mentioned valves in a control manner. The off-gas emission pipe is further provided with an off-gas emission safety valve 45 and an off-gas emission pipe trap 46. The condensed water storage tank is provided with an overflow port 47 and an automatic drain valve 48 which is connected to the PLC controller. The other end of the intake main pipe is further provided with an intake main pipe trap 49 which is connected to the PLC controller. The air intake pipe is provided with a filter 50. The cylinder atomized water pipeline is further provided with a cylinder atomized water control valve 51 which is connected to the PLC controller. The oxygen main pipeline is further provided with an oxygen cut-off valve 52.

A method of using the hydrogen-oxygen cycle engine provided in the present invention includes the following steps:
  1) starting the engine by means of an ignition switch, and supplying power to various components of the hydrogen-oxygen cycle engine; when the engine is cold started for the first time, first switching on, by the PLC controller, an air control valve to introduce starting air; controlling, the PLC controller according to a feedback value of a data signal of a hydrogen flow sensor, a throttle of the engine to inject hydrogen into a cylinder by means of a nozzle, such that hydrogen combusts with oxygen to push a piston, which in turn drives a connecting rod and a crankshaft to reciprocate and do work, and water steam formed after combustion passes through an exhaust valve and an exhaust branch pipe and then an exhaust main pipe, with part of the water steam entering a circulating pipeline to be mixed with oxygen by means of a flow control valve and then entering the cylinder to be mixed with hydrogen for combustion, and part of the water steam being condensed into water in a condenser through a condensed water pipeline and then entering a water storage tank for recycling as atomized water; gradually switching on, the PLC controller according to feedback values of data signals of the hydrogen flow sensor and an oxygen flow sensor, an oxygen flow control valve to introduce oxygen, and synchronously switching off same until the air control valve is switched off to stop air from entering, in this case a hydrogen and oxygen combustion stage is entered, and a produced water steam circulating medium is emitted into atmosphere from an off-gas emission pipe on an exhaust main pipe bypass; and adjusting, the PLC controller according to a feedback value of a circulating medium pressure sensor, emissions of the water steam by controlling an off-gas emission control valve, where when the pressure on a circulating medium pipeline rises to a set safety value, an off-gas emission safety valve is automatically switched on to ensure stable pressure of the system;

2) after the above-mentioned step 1), introducing, the PLC controller according to the feedback values of data signals of the oxygen flow sensor and the circulating medium pressure sensor under operating conditions of the cylinder assembly, oxygen and the circulating medium into the cylinder through an intake main pipe, an intake branch pipe and an intake valve by controlling an oxygen main pipe control valve; introducing hydrogen and the circulating medium into the cylinder through a hydrogen pipeline, a circulating medium branch pipeline and the nozzle by controlling a hydrogen throttle control valve and a circulating medium branch pipeline control valve, and automatically switching on a cylinder atomized water control valve at the same time to spray atomized water into the cylinder; and monitoring, the PLC controller, the feedback value of data signals of an oxygen/hydrogen content sensor in the circulating medium pipeline in real time, and adjusting trace hydrogen and oxygen content in the circulating medium in a timely manner by controlling an oxygen branch pipe control valve, so as to ensure the hydrogen and oxygen combustion is always in an optimal state;

3) acquiring, by the PLC controller according to the operating conditions of the cylinder assembly, the feedback values of data signals of the hydrogen flow sensor, the circulating medium pressure sensor, the oxygen flow sensor and the oxygen/hydrogen content sensor, and automatically controlling, by the PLC controller according to the feedback value of the hydrogen flow sensor, various control valves and adjusting the flow of the oxygen, circulating medium and atomized water, such that the engine operates in stable conditions;

4) monitoring, by the PLC controller, the operating conditions of the engine in real time, and automatically adjusting an opening of an atomized water control valve of the intake branch pipe, to spray atomized water into the intake branch pipe;

5) continuously circulating the circulating medium in the cylinder of the engine according to steps 1), 2), 3), and 4); continuously adjusting, by the hydrogen-oxygen cycle engine, the amount of hydrogen injected through the nozzle to achieve large torque at low speed and large load and small torque at high speed and small load during operation; and monitoring, by the PLC controller, a temperature value of the circulating medium in real time according to a feedback value of a data signal of a temperature sensor in an exhaust pipe under the operating conditions of the cylinder assembly, so as to ensure a stable operating temperature of the engine;

6) when oxygen in an oxygen storage tank of the hydrogen-oxygen cycle engine is almost running out, issuing, by an oxygen pressure sensor, a signal, and at this time, automatically switching on, by the PLC controller, the air control valve, switching off an oxygen cut-off valve, automatically switching to an air combustion mode, and switching off a circulating medium pipeline control valve at the same time, such that part of the water steam generated by the engine is condensed into water in the condenser through the condensed water pipeline and then enters the water storage tank for recycling as atomized water, and part is emitted into atmosphere by means of the off-gas emission control valve and is no longer circulated;

when the engine stops, first switching off a hydrogen control valve to stop the supply of hydrogen, switching off an oxygen control valve at the same time, then delaying the switching off of a circulating water steam control valve, and bringing the residual hydrogen and oxygen in mixing pipelines of the engine into the cylinder using circulating water steam to continue to combust cleanly, so that the problem of residual hydrogen and oxygen in the pipelines of the engine leaking into the cylinder is solved;

7) issuing, by a hydrogen pressure sensor provided on the hydrogen pipeline of the hydrogen-oxygen cycle engine, an alarm signal to remind the supplement of hydrogen when the pressure of hydrogen is lower than a set value;

8) automatically discharging the condensed water in the pipelines by means of automatic traps provided on both the off-gas emission pipe and a medium circulation pipeline of the hydrogen-oxygen cycle engine during the operation of the engine;

9) the hydrogen-oxygen cycle engine being provided with an automatic drain valve, an overflow valve and a temperature sensor on the water storage tank, after the engine stops operating, monitoring, by the PLC controller, a feedback value of the temperature sensor, and when the temperature value reaches a freezing point, automatically draining the water in the water storage tank; and 10) cutting off the supply of hydrogen and oxygen promptly to ensure safe operation of the engine under emergency conditions that, for example, the oxygen and hydrogen pressures are lower than set values, the temperature of the circulating medium is higher than a set value, a collision occurs, and the hydrogen-oxygen cycle engine catches fire by means of emergency shut-off valves, inertia switches, and low-pressure interlock alarm devices provided on the hydrogen and oxygen pipelines, and a high-temperature interlock alarm device provided on the circulating medium pipeline of the hydrogen-oxygen cycle engine.

The operating conditions of the cylinder assembly include a start and stop condition, an acceleration condition, a deceleration condition, an idle condition, and an air condition.

The above-mentioned description of the embodiments is provided to facilitate the understanding and application of the present invention by those of ordinary skill in the art. Those skilled in the art can easily make various modifications to these embodiments in an obvious way and apply the general principles illustrated herein to other embodiments without creative efforts. Therefore, the present invention is not limited to the embodiments here. Based on the disclosure of the present invention, improvements and modifications made by those skilled in the art without departing from the scope of the present invention should fall within the scope of protection of the present invention.

What is claimed is:

1. A hydrogen-oxygen cycle engine, comprising:
a cylinder assembly, a hydrogen supply assembly, an oxygen supply assembly, a circulating medium assembly, an atomized water assembly, a condensed water recovery assembly, and a control system, wherein the cylinder assembly comprises a cylinder body, a first intake branch pipe, an intake valve, an exhaust valve, an exhaust branch pipe, a nozzle, a piston, a connecting rod, and a crankshaft;

the piston is drivingly connected to the crankshaft via the connecting rod, the piston is arranged in the cylinder body, and a top of the cylinder body is respectively connected to the intake valve, the exhaust valve, and the nozzle;

one end of the first intake branch pipe is connected to the intake valve, and one end of the exhaust branch pipe is connected to the exhaust valve;

the hydrogen supply assembly comprises a hydrogen storage tank, a hydrogen flame arrester, and a hydrogen pipeline;

both ends of the hydrogen pipeline are respectively connected to the hydrogen storage tank and the nozzle, and the hydrogen flame arrester is arranged at a joint between the hydrogen storage tank and the hydrogen pipeline;

the oxygen supply assembly comprises an oxygen storage tank, an oxygen intake main pipe, and an oxygen intake branch pipe;

one end of the oxygen intake main pipe is connected to the hydrogen storage tank, and one end of the oxygen intake branch pipe is connected to the oxygen intake main pipe;

the atomized water assembly comprises an atomized water storage tank, a cylinder atomized water pipeline, an intake branch pipe atomized water pipeline, and a delivery pump;

both ends of the intake branch pipe atomized water pipeline are respectively connected to the atomized water storage tank and the first intake branch pipe;

one end of the cylinder atomized water pipeline is connected to the intake branch pipe atomized water pipeline, and the other end thereof is connected to the nozzle;

the delivery pump is arranged at a joint between the atomized water storage tank and the intake branch pipe atomized water pipeline;

the circulating medium assembly comprises a circulating medium pipeline, a circulating medium branch pipeline, an intake main pipe, and an exhaust main pipe;

both ends of the circulating medium pipeline are respectively connected to one end of the intake main pipe and one end of the exhaust main pipe, and both ends of the circulating medium branch pipeline are respectively connected to the other end of the exhaust main pipe and the hydrogen pipeline;

the other end of the oxygen intake main pipe is connected to the intake main pipe, and the other end of the oxygen intake branch pipe is connected to the intake main pipe;

the other end of the intake main pipe is connected to the first intake branch pipe;

the condensed water recovery assembly comprises a condenser, a condensed water pipeline, and a condensed water storage tank which is arranged in the atomized water storage tank;

both ends of the condensed water pipeline are respectively connected to one end of the condenser and the condensed water storage tank;

the other end of the condenser is connected to the exhaust main pipe;

the condensed water storage tank is connected to the atomized water storage tank;

the intake main pipe is further provided with an air intake pipe;

the exhaust main pipe is further provided with an off-gas emission pipe which is connected to the exhaust main pipe;

the control system comprises a PLC controller, a human-computer interaction interface, and sensor assemblies;

the PLC controller is respectively connected to the human-computer interaction interface and the sensor assemblies;

the sensor assemblies comprise: a hydrogen flow sensor, a hydrogen pressure sensor, a hydrogen cut-off valve and a hydrogen throttle control valve which are arranged on the hydrogen pipeline, a cylinder atomized water control valve arranged on the cylinder atomized water pipeline, a temperature sensor arranged on the exhaust main pipe, an oxygen pressure sensor, an oxygen flow sensor and an oxygen flow control valve which are arranged on an oxygen main pipeline, an oxygen branch flow control valve arranged on an oxygen branch, a circulating medium pressure sensor arranged on the intake main pipe, an oxygen/hydrogen content sensor and a circulating medium control valve which are arranged on the circulating medium pipeline, an air intake control valve arranged on the air intake pipe, an off-gas emission control valve arranged on the off-gas emission pipe, and a branch pipe flow control valve arranged on the circulating medium branch pipeline; and sensors including the hydrogen flow sensor, the hydrogen pressure sensor, the temperature sensor, the oxygen pressure sensor, the oxygen flow sensor, the circulating medium pressure sensor, and the oxygen/hydrogen content sensor are all connected to the PLC controller via data signals, and the PLC controller is connected to valves including the hydrogen cut-off valve, the hydrogen throttle control valve, the cylinder atomized water control valve, the oxygen flow control valve, the oxygen branch flow control valve, the circulating medium control valve, the air intake control valve, the off-gas emission control valve, and the branch pipe flow control valve in a control manner.

2. The hydrogen-oxygen cycle engine of claim 1, wherein
the off-gas emission pipe is further provided with an off-gas emission safety valve and an off-gas emission pipe trap;
the condensed water storage tank is provided with an overflow port, and an automatic drain valve connected to the PLC controller; and
the other end of the intake main pipe is further provided with an intake main pipe trap which is connected to the PLC controller.

3. The hydrogen-oxygen cycle engine of claim 2, wherein
the air intake pipe is provided with a filter;
the cylinder atomized water pipeline is further provided with a cylinder atomized water control valve which is connected to the PLC controller; and
the oxygen main pipeline is further provided with an oxygen cut-off valve.

4. The hydrogen-oxygen cycle engine of claim 1, wherein
medium in the circulating medium assembly includes water steam; and
the hydrogen-oxygen cycle engine uses hydrogen as a fuel and oxygen as a combustion aid, and an off-gas after engine combustion contains only H2O.

5. The hydrogen-oxygen cycle engine of claim 1, wherein
the hydrogen-oxygen cycle engine adopts oxygen and hydrogen flow ratio control, and the PLC controller adjusts oxygen supply according to a data signal of the hydrogen flow sensor, to realize adjustment of a hydrogen and oxygen combustion ratio.

6. The hydrogen-oxygen cycle engine of claim 1, wherein
the PLC controller realizes, according to a data signal fed back by the oxygen/hydrogen content sensor in the circulating medium pipeline, oxygen fine tuning by controlling an oxygen branch pipe control valve.

7. The hydrogen-oxygen cycle engine of claim 1, wherein
the hydrogen-oxygen cycle engine has two operating modes of an oxygen-assisted combustion and an air-assisted combustion, which are able to be automatically switched.

8. The hydrogen-oxygen cycle engine of claim 1, wherein
the hydrogen-oxygen cycle engine is applied in automotive internal combustion engines, marine internal combustion engines, and/or power generation internal combustion engines.

9. A method of using a hydrogen-oxygen cycle engine, comprising:
1) Starting the engine using an ignition switch to supply power; when the engine is cold started for a first time, first switching on, by a PLC controller, an air control valve to introduce starting air; controlling, by the PLC controller according to a feedback value of a data signal of a hydrogen flow sensor, a throttle of the engine to inject hydrogen into a cylinder by means of a nozzle, such that hydrogen combusts with oxygen to push a piston, which in turn drives a connecting rod and a crankshaft to reciprocate and operate, and water steam formed after combustion passes through an exhaust valve and an exhaust branch pipe and an exhaust main pipe, with part of the water steam entering a circulating pipeline to be mixed with oxygen by means of a flow control valve and then entering the cylinder to be mixed with hydrogen for combustion, and part of the water steam being condensed into water in a condenser through a condensed water pipeline and then entering a water storage tank for recycling as atomized water; gradually switching on, by the PLC controller according to feedback values of data signals of the hydrogen flow sensor and an oxygen flow sensor, an oxygen flow control valve to introduce oxygen, and synchronously switching off same until the air control valve is switched off to stop air from entering, and a produced water steam circulating medium is emitted into atmosphere from an off-gas emission pipe on an exhaust main pipe bypass; and adjusting, by the PLC controller according to a feedback value of a circulating medium pressure sensor, emissions of the water steam by controlling an off-gas emission control valve, wherein when a pressure on a circulating medium pipeline rises to a set safety value, an off-gas emission safety valve is automatically switched on to ensure stable pressure;

2) introducing, by the PLC controller according to the feedback values of data signals of the oxygen flow sensor and the circulating medium pressure sensor under operating conditions of a cylinder assembly, oxygen and the circulating medium into the cylinder through an intake main pipe, an intake branch pipe and an intake valve by controlling an oxygen main pipe control valve; introducing hydrogen and the circulating medium into the cylinder through a hydrogen pipeline, a circulating medium branch pipeline and a nozzle by controlling a hydrogen throttle control valve and a circulating medium branch pipeline control valve, and automatically switching on a cylinder atomized water control valve at a same time to spray atomized water into the cylinder; and monitoring, by the PLC controller, feedback values of data signals of an oxygen/hydrogen content sensor in the circulating medium pipeline in real time, and adjusting trace hydrogen and oxygen content in the circulating medium in a timely manner by controlling an oxygen branch pipe control valve;

3) Acquiring, by the PLC controller according to the operating conditions of the cylinder assembly, the feedback values of data signals of the hydrogen flow sensor, the circulating medium pressure sensor, the oxygen flow sensor and the oxygen/hydrogen content sensor, and automatically controlling, by the PLC controller according to the feedback value of the hydrogen flow sensor, control valves and adjusting the flow of the oxygen, circulating medium and atomized water;

4) Monitoring, by the PLC controller, the operating conditions of the engine in real time, and automatically adjusting an opening of an atomized water control valve of the intake branch pipe to spray atomized water into the intake branch pipe;

5) Continuously circulating the circulating medium in the cylinder of the engine according to steps 1), 2), 3), and 4); continuously adjusting, by the hydrogen-oxygen cycle engine, the amount of hydrogen injected through the nozzle to achieve large torque at low speed and large load and small torque at high speed and small load during operation; and monitoring, by the PLC controller, a temperature value of the circulating medium in real time according to a feedback value of a data signal of a temperature sensor in an exhaust pipe under the operating conditions of the cylinder assembly, so as to ensure a stable operating temperature of the engine;

6) When oxygen in an oxygen storage tank of the hydrogen-oxygen cycle engine is almost running out, issuing, by an oxygen pressure sensor, a signal, and at this time, automatically switching on, by the PLC controller, the air control valve, switching off an oxygen cut-off valve, automatically switching to an air combustion mode, and switching off a circulating medium pipeline control valve at the same time, such that part of the water steam generated by the engine is condensed into water in the condenser through the condensed water pipeline and then enters the water storage tank for recycling as atomized water, and part is emitted into atmosphere using the off-gas emission control valve and is no longer circulated;

7) Issuing, by a hydrogen pressure sensor provided on the hydrogen pipeline of the hydrogen-oxygen cycle engine, an alarm signal to remind supplement of hydrogen when the pressure of hydrogen is lower than a set value;

8) Automatically discharging the condensed water in the pipelines by means of automatic traps provided on both the off-gas emission pipe and a medium circulation pipeline of the hydrogen-oxygen cycle engine during the operation of the engine;

9) The hydrogen-oxygen cycle engine being provided with an automatic drain valve, an overflow valve and a temperature sensor on the water storage tank, after the engine stops operating, monitoring, by the PLC controller, a feedback value of the temperature sensor, and when a temperature value reaches a freezing point, automatically draining the water in the water storage tank; and 10) Cutting off the supply of hydrogen and oxygen promptly to ensure safe operation of the engine under emergency conditions including that the oxygen and hydrogen pressures are lower than set values, the temperature of the circulating medium is higher than a set value, a collision occurs, and the hydrogen-oxygen cycle engine catches fire by means of emergency shut-off valves, inertia switches, and low-pressure interlock alarm devices provided on the hydrogen and oxygen pipelines, and a high-temperature interlock alarm device provided on the circulating medium pipeline of the hydrogen-oxygen cycle engine.

10. The method of using the hydrogen-oxygen cycle engine of claim 9, wherein the operating conditions of the cylinder assembly comprise a start and stop condition, an acceleration condition, a deceleration condition, an idle condition, and an air condition.

11. The method of using the hydrogen-oxygen cycle engine of claim 9, wherein when the engine stops, a hydrogen control valve is first switched off to stop the supply of hydrogen, an oxygen control valve is switched off at the same time, then switching off of a circulating water steam control valve is delayed, and residual hydrogen and oxygen in mixing pipelines of the engine are brought into the cylinder using the circulating medium to continue to combust cleanly.

* * * * *